No. 676,635. Patented June 18, 1901.
A. SNELL.
CUTTING TABLE FOR PLASTIC MATERIAL.
(Application filed Oct. 20, 1900.)
(No Model.) 2 Sheets—Sheet 2.
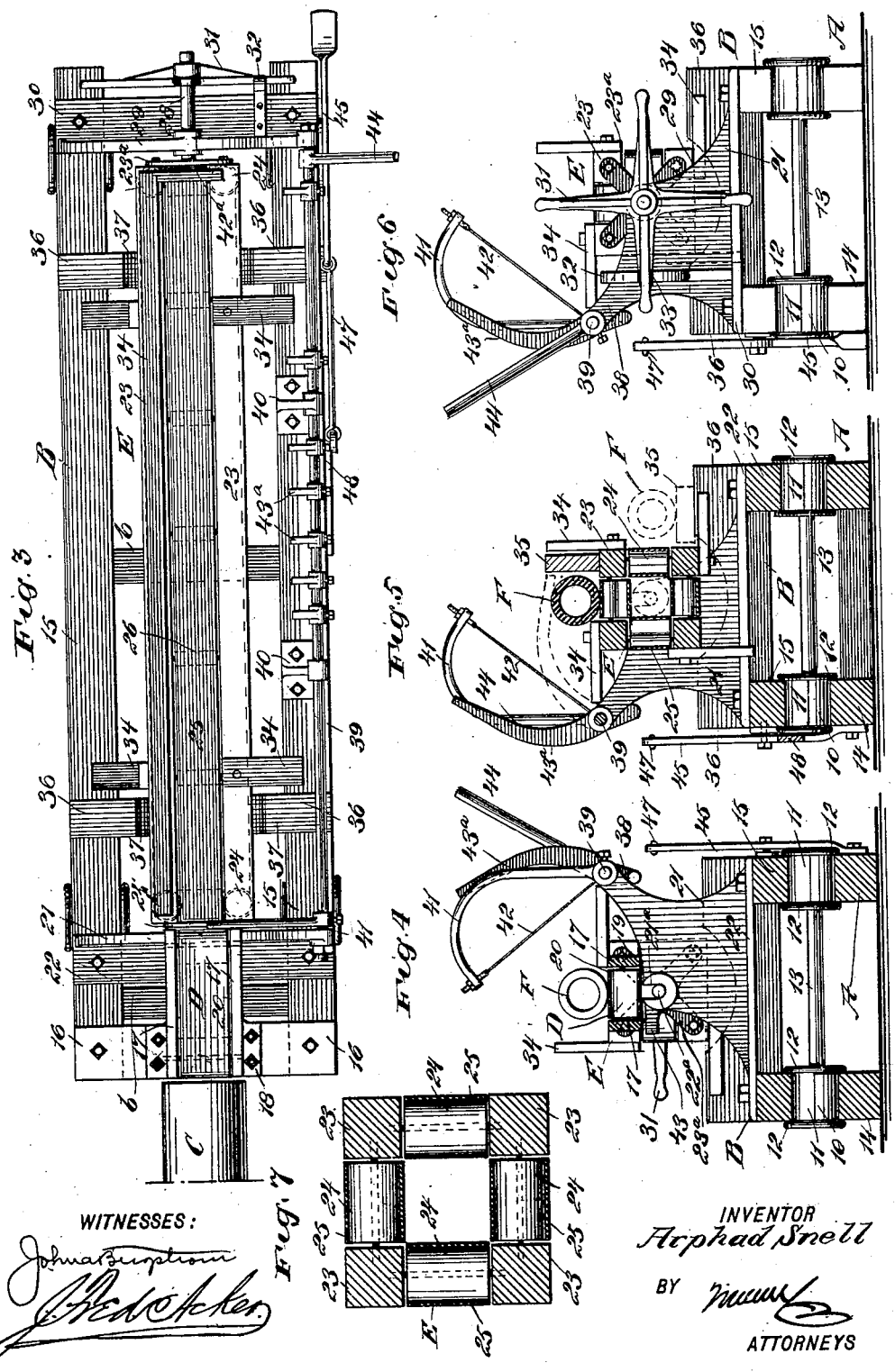
WITNESSES:
INVENTOR
Arphad Snell
BY
ATTORNEYS

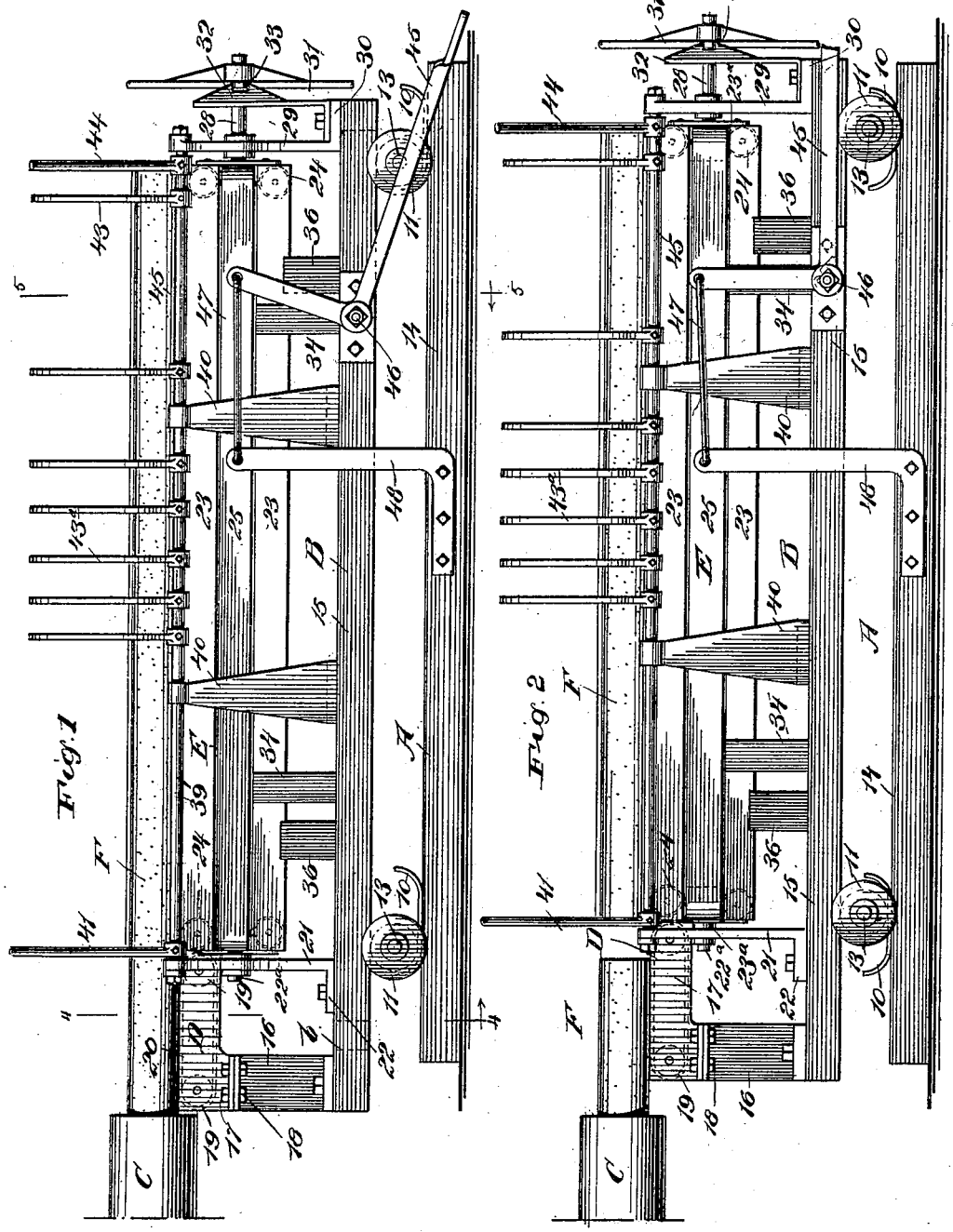

UNITED STATES PATENT OFFICE.

ARPHAD SNELL, OF TICE, ILLINOIS.

CUTTING-TABLE FOR PLASTIC MATERIAL.

SPECIFICATION forming part of Letters Patent No. 676,635, dated June 18, 1901.

Application filed October 20, 1900. Serial No. 33,724. (No model.)

*To all whom it may concern:*

Be it known that I, ARPHAD SNELL, a citizen of the United States, and a resident of Tice, in the county of Menard and State of Illinois, have invented a new and Improved Cutting-Table for Plastic Material, of which the following is a full, clear, and exact description.

My invention relates to an improvement in cutting-tables for plastic material, and especially to an improvement upon the construction disclosed in a patent granted to me December 6, 1898, No. 615,582.

The purpose of this invention is to simplify the general construction of the machine and to mount a fixed and a rotary conveyer-table upon the same carriage; also, to provide means for moving the carriage to and from the mold or shaping-machine, limiting the movement of said carriage at such time, which movement may be manually conducted.

Another purpose of the invention is to provide a simple mechanism for turning the rotary conveyer-table and locking it temporarily in desired position and to so construct the rotary conveyer-table that it will have a series of belts upon which the molded article is received.

A further purpose of the invention is to provide fingers operated simultaneously with the cutting mechanism, which fingers serve to make depressions in a molded fence-post, for example, at desired intervals apart, the said depressions being intended to receive fence-wires.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved machine, illustrating the carriage as close to the mold. Fig. 2 is a side elevation of the machine, illustrating the carriage as removed from the mold and the molded material as cut to the desired length. Fig. 3 is a plan view of the improved machine. Fig. 4 is a transverse section taken practically on the line 4 4 of Fig. 1. Fig. 5 is a transverse section taken substantially on the line 5 5 of Fig. 1. Fig. 6 is a rear end view of the machine, and Fig. 7 is an enlarged transverse section through the rotary conveyer-table.

A base A of any approved description is provided for the machine, and on the side sills 14 of this base, near its ends, tracks 10 are located, having their ends upturned, and these tracks receive the tread portions of wheels 11, said wheels being provided with flanges 12. The flanges engage with the inner and outer faces of the side sills 14 of the base A and likewise with the inner and outer faces of the side sills 15 of a carriage B, which is supported on said wheels. Thus it will be observed that the end movement of the carriage B is limited by the said tracks 10. Corresponding wheels at the ends of the base A are connected by suitable axles 13, and the side sills 15 of the carriage are connected at suitable intervals by cross-bars $b$.

At the receiving or forward end of the carriage B uprights 16 are secured to the side sills through the medium of suitable flanges at their bottom portions, and these uprights at their upper ends are provided with outwardly-extending flanges which engage with outwardly-extending flanges formed on the side pieces 17 of a fixed conveyer D, the flanges of the side pieces of the conveyer and the top flanges of the uprights 16 being connected by suitable bolts 18. The stationary conveyer D extends in a forward direction a slight distance over the bottom portion of the carriage B, as is shown in Figs. 1, 2, and 3. The conveyer D is completed by locating drums 19 at its forward and rear ends, over which drums an endless belt 20 is passed. A standard 21, provided with a bottom flange 22, is located upon the carriage B, the flange 22 being secured to the side beams 15 of the said carriage. This standard 21 supports the inner end of the conveyer D by engagement with the side portions 17 of said conveyer, and the said standard 21 is provided with a slot $21^a$, made in its upper edge, and this slot $21^a$ receives the forward trunnions $22^a$ of a rotary conveyer-table E. A transverse section of this rotary receiving-table is shown in Fig. 7, and said rotary receiving-table is preferably rectangular in cross-section, although it may be polygonal, and consists usually of corner-beams 23, connected at their ends by spider-plates 23ª, and in the spaces between the opposing faces of the corner-beams 23 drums 24 are mounted to turn at the end portions of the said rotary receiving or conveyer table. Endless belts 25 are passed over corresponding drums 24 at the end portions of said rotary conveyer-table, the belts being supported intermediate of the ends of the rotary table by intermediate rollers 26. (Shown in dotted lines in Fig. 3.) Thus it will be observed that the stationary conveyer-table D and the rotary conveyer-table E are both mounted on the same carriage B and that the forward end of the rotary conveyer-table is quite close at all times to the inner end of the stationary conveyer-table, so that the material F, which is formed in a mold C, will pass from the mold onto the upper surface of the belt of the fixed conveyer-table and will then pass on to the uppermost belt of the rotary conveyer-table E.

A trunnion 28 is secured to the connecting-plate 23ª at the rear end of the rotary conveyer-table E, and this trunnion 28 is passed through suitable bearings in an upright 29, provided with a base-flange 30, which is secured to the sills or side beams of the carriage B at its rear end, as is illustrated in Figs. 1, 2, and 3 and in Fig. 6. At the rear end of the trunnion 28 a hand-wheel 31 is secured, which usually consists of a hub and four spokes at equal distances apart, although I do not restrict myself to the number of spokes or to the formation of this wheel. Through the medium of the hand-wheel 31 the rotary conveyer-table is turned, so as to bring one face after the other in an upper position or in position to receive the molded material F, which may be a fence-post, for example. When one face of the rotary conveyer-table is brought uppermost, a spoke of the hand-wheel 31 will enter a notch or recess 33 in a spring-arm 32, projected rearward from the upright 29, and this will temporarily hold the rotary conveyer-table in its adjusted position. When the rotary conveyer-table is thus turned, the molded material on what was formerly the upper face of the table will be carried downward at a side of the said rotary conveyer-table, as shown in dotted lines in Fig. 5.

Arms 34 extend at right angles from each side face of the rotary conveyer-table and above one of its receiving-faces, as is particularly shown in Fig. 5. These arms need necessarily be placed only at the end portions of the rotary conveyer-table and are adapted as supports for pallets 35, which pallets are preferably in the form of boards or plates extending from end to end of the rotary conveyer-table. The pallet at the uppermost face of the said rotary conveyer-table, as shown in Fig. 5, is in position to receive the molded article F when the said rotary conveyer-table is turned, and at such time the pallet 35, which formerly occupied an upper position, will occupy the horizontal position shown in Fig. 5 and the molded article F will rest upon the pallet. Just prior to the pallet occupying the horizontal position shown in dotted lines in Fig. 5 it will engage with stops 36, secured on the sills of the carriage B, and these stops, where they face said rotary conveyer-table, are provided with concavities 37, (shown in Fig. 3;) but the inner edges of the stops 36, where the concavities 37 commence, are of such a height that as the rotary conveyer-table E is revolved a quarter of a turn, for example, the upper inner edges of a stop 36 will engage with the lowered pallet 35 and will raise the said pallet slightly from the arms 34, enabling persons at the ends of the machine to readily take hold of the pallet and lift it from the rotary conveyer-table and carry said pallet and the molded material thereon to any desired point for any necessary purpose. An arm 38 is extended from the same side of the front and rear uprights 21 and 29 at one side of the machine, and these arms 38 serve to journal the ends of a shaft 39, which shaft may also be supported intermediate of its ends by suitable bearings 40, supported on the base of the carriage, as shown in Fig. 1.

At the forward end of the shaft 39 a bar 41 is secured, the upper end of which bar is bowed or curved over and in direction of the meeting-point of the rotary conveyer-table E and the stationary conveyer-table D. This arched bar 41 carries a wire 42 or the equivalent thereof, which wire is placed under suitable tension in any approved manner, and this wire as the shaft 39 is turned in one direction passes down and engages with the molded article F and cuts the said article to a suitable length, the rear end of the molded article at that time engaging with an offset 42ª, formed at the rear end portion of the rotary conveyer-table E. The downward movement of the said cutting device is limited by projecting a stop 43 from the standard 21, with which the curved end of the bar 41 engages in its downward movement.

Fingers 43ª are adjustably secured on the shaft 39 by means of set-screws or other devices, and these fingers are also more or less curved in direction of the receiving-face of the rotary conveyer-table. The purpose of these fingers is to produce depressions or recesses in the molded article F, carried by the rotary conveyer-table E, as, for example, if this molded material is a fence-post these fingers, being suitably spaced, will produce depressions or indentations in the molded material at such points as it is desired that the wires of a fence shall pass. I desire it to be understood, however, that these arms or fingers 43ª may be given any desired shape, so as to produce any desired form of cavity in the molded material, and that these fingers may be dispensed with, if desired.

The shaft 39 is illustrated as manually operated through the medium of a lever 44, which is attached to the shaft at its rear end and can be manipulated by the same person operating the hand-wheel 31, so that only one individual is actually required in the manipulation of the machine.

The carriage B is held in near relation to the molding device or machine C usually by means of a foot-lever 45; but this lever may be substituted by a hand-lever, if desired. This lever 45 is preferably a bell-crank or angle lever and is connected by a pivot-pin 46 with a side of one of the sills of the carriage B, near the rear end of the carriage, and the upper member of the lever 45 is connected by a link 47 with a standard 48, which is secured to the base A.

In operation by pressing down on the lower member of the lever 45 the carriage is carried to a close connection with the molding device or machine and is so held while the molded plastic material is received upon the belt of the fixed conveyer D and is directed upon the uppermost belt of the rotary conveyer-table E. It will be observed that owing to the pulleys and belts used in connection with this conveyer there will be comparatively little friction between the conveyers and molded plastic material as the latter is fed to its destination, since as the molded material is received by the machine the belts upon which it rests will be given movement by frictional contact with the material. Under this construction it will be observed that the face of the material brought in contact with the conveyers will be in no manner marred. When the molded material has reached an outer barrier 42$^a$ on the revolving conveyer-table, the operator will release the lever 45 and immediately upon releasing the lever will turn the lever 44, which will cause the cutter 42 to sever the molded material at that point where the rotary conveyer commences, and at the same time the fingers or arms 43$^a$ will indent the molded material. The operator immediately afterward will pull outward on the hand-wheel 31, and this will take the carriage B away from the molding-machine C; but a portion of the molded material will yet remain upon the first or stationary conveyer D and the parts will be as shown in Fig. 2, the cut portion of the molded material being separated from that which is connected with the molding-machine. As soon as the carriage is thus drawn from the molding-machine the hand-wheel 31 is turned, so as to present another face of the rotary conveyer-table at the top of the machine, and the molded material just cut will be carried to one side of the rotary conveyer-table and can be removed with its pallet, as has been described.

I desire it to be understood that the cut and molded material may be delivered either to the right or to the left hand side of the machine, as may be found desirable.

It may here be remarked that the stops 36 serve to hold the pallets 35 in a horizontal position until the rotary conveyer-table is again turned, thus leaving the table free to turn and permitting the operator to move the pallet just before the rotary table is to be given a turn. The arms 34, extending from the rotary conveyer-table and serving to support the pallets 35 in the movement of the table, are so placed that the stops 36 will not interfere with them, as shown in Fig. 3.

Having thus described my invention, I claim as new and desire to secure by Letters Patent—

1. A rotary cutting-table having a plurality of longitudinally-extending receiving-faces and longitudinally-extending endless belts which form portions of said faces.

2. A carriage having end movement, and a cutting-table mounted to revolve upon the carriage and extending longitudinally thereof, the said table being provided with a plurality of receiving-faces and longitudinally-extending endless belts constituting portions of said faces.

3. A carriage having end movement, means for limiting the end movement of the carriage, and a cutting-table mounted to revolve upon the carriage and provided with endless belts at its supporting-faces.

4. In a machine for handling plastic material and for similar purposes, a carriage having end movement, a cutting-table mounted to revolve upon the carriage and having endless belts at its supporting-faces, means for imparting end movement to the carriage, and means for limiting the end movement of the carriage, as set forth.

5. A rotary cutting-table having a plurality of receiving-faces, drums located at the ends of each receiving-face, and endless belts extending over the drums and forming portions of said receiving-faces, as described.

6. In a machine for handling plastic material and for similar purposes, a reciprocating carriage, a fixed receiving-table on said carriage, a rotary table mounted upon the carriage and having a plurality of receiving-faces, and endless belts located at the receiving-faces as set forth.

7. A carriage having end movement, a cutting-table mounted to revolve upon the carriage, the table having a plurality of receiving-faces, a shaft carried by the carriage, a cutter mounted upon said shaft having movement to and from the table, and means for operating said shaft, as described.

8. A carriage having end movement, a cutting-table mounted to revolve upon the carriage, conveyers constituting a portion of the receiving-faces of the table, a locking device operating to temporarily hold a face of the receiving-table in a horizontal position, a shaft carried by the carriage, a cutting device carried by the shaft, and means for operating said shaft.

9. A carriage having end movement, a cutting-table mounted to revolve upon the carriage, the table having a plurality of receiving-faces, a shaft extending longitudinally at one side of the carriage and having its ends journaled in suitable supports carried by the carriage a bar carried by the shaft at its forward end, a cutting device carried by said bar, an operating-lever connected with the shaft at its rear end, and means for limiting the movement of the cutting device as set forth.

10. In a machine for handling plastic material and for similar purposes, a reciprocating carriage, a receiving-table stationarily connected with the carriage and provided with an endless conveying-belt, a revolving table mounted upon the same carriage and having a plurality of receiving-faces, and endless conveying-belts located at the receiving-faces of the revolving table, the receiving end of one table being opposite the dispensing end of the other table as specified.

11. In a machine for handling plastic material and for similar purposes, a reciprocating carriage, a receiving-table stationarily attached to said carriage and provided with an endless conveying-belt, a second table having a plurality of receiving-faces and mounted to revolve on said carriage, the uppermost receiving-face of the revolving table being in the same horizontal plane, with the stationary table, endless belts located at the receiving-faces of the revolving table, means for rotating and for locking the revolving table, and a device for imparting end movement to the carriage for the purpose set forth.

12. In a machine for handling plastic material and for similar purposes a reciprocating carriage, a receiving-table stationarily connected with the carriage, a table mounted to rotate upon the same carriage, the receiving end of one table abutting the dispensing end of the other table, a locking device for the rotating table a shaft carried by the carriage, a cutter mounted upon said shaft and means for operating said shaft, as and for the purpose set forth.

13. A carriage having end movement, a cutting-table mounted to revolve upon the carriage, the table having a plurality of receiving-faces, a shaft carried by the carriage, a cutter mounted upon said shaft, having movement to and from the table, marking-fingers also carried by the shaft and adapted to have movement to and from the cutting-table, and means for operating said shaft, as described.

14. In a machine for handling plastic material and for other purposes, a reciprocating carriage, a receiving-table stationarily connected with the carriage, a revolving table mounted upon the same carriage, the receiving end of one table abutting the dispensing end of the other table, a shaft mounted on the carriage parallel with the rotating table, a cutter mounted on said shaft, marking-fingers adjustably mounted on the said shaft, extensions from the sides of the rotating table, adapted to receive pallets, and means for rotating the rotary table and for locking the same in different positions, as set forth.

15. In a machine for handling plastic material and for similar purposes, the combination, with a base provided with tracks having upturned ends and wheels mounted on said tracks, of a carriage mounted on said wheels, a table stationarily attached to said carriage and provided with an endless conveying-belt, a second table having a plurality of receiving-faces, mounted to revolve on said carriage, the uppermost receiving-face of the revolving table being in the same horizontal plane with the stationary table, endless belts located at the receiving-faces of the revolving table, means for rotating and for locking the revolving table, and a device for giving end movement to the carriage, as and for the purpose specified.

16. In a machine for handling plastic material and for similar purposes, the combination, with a base provided with tracks having upturned ends and wheels mounted on said tracks, of a carriage mounted on said wheels, a table stationarily attached to the said carriage and provided with an endless conveying-belt, a second table having a plurality of receiving-faces, mounted to revolve upon the said carriage, the uppermost receiving-face of the revolving table being in the same horizontal plane with the stationary table, endless belts located at the receiving-faces of the revolving table, means for rotating and locking the revolving table, a device for giving end movement to the carriage, a shaft mounted on the carriage parallel with a side of the revolving table, a cutter secured to said shaft opposite the receiving end of the revolving table, and fingers adjustably mounted on the said shaft, which fingers are adapted to engage with an object carried by the uppermost receiving-face of the rotating table, for the purpose described.

17. In a machine for handling plastic material, a carriage, a cutting-table carried by the carriage, a shaft carried by the carriage, a cutter mounted upon the shaft, marking-fingers carried by the shaft, the cutter and marking-fingers being arranged to move to and from the cutting-table, and means for operating the shaft.

18. In a machine for handling plastic material and for like purposes, a rotary table comprising corner-beams connected at their ends by spider-plates, drums mounted to turn in the spaces between the opposing faces of the corner-beams at the end portions of the said table, and endless belts passed over corresponding drums at the end portions of the table, substantially as set forth.

19. In a machine for handling plastic material and for similar purposes, a table mounted to rotate and having a plurality of longitudinally-extending receiving-faces, a longitudinally-extending belt arranged at each receiving-face, and means for rotating said table and for locking it in position, as set forth.

20. In a machine for handling plastic material and for similar purposes, a cutting-table, a cutter, means for operating the same, and marking-fingers operating simultaneously with the cutter, for the purpose set forth.

21. In a machine for handling plastic material and for similar purposes, a cutting-table mounted to revolve and having a plurality of receiving-faces, a cutter, a shaft carrying said cutter, means for operating said shaft, the said cutter having movement to and from the table, and marking-fingers also carried by said shaft, as set forth.

In testimony whereof I have signed my name to this specification in the presence of two subscribing witnesses.

ARPHAD SNELL.

Witnesses:
 J. FRED. ACKER,
 EVERARD BOLTON MARSHALL.